United States Patent
Gonzalez Diaz et al.

(10) Patent No.: US 12,162,139 B1
(45) Date of Patent: Dec. 10, 2024

(54) GRIPPING TOOL WITH EXPANDABLE, COMPLIANT GRIPPERS, AND RELATED SYSTEMS AND METHODS

(71) Applicant: Amazon Technologies, Inc., Seattle, WA (US)

(72) Inventors: Daniel Enrique Gonzalez Diaz, Cambridge, MA (US); Fan Wang, Woburn, MA (US); Jane Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 642 days.

(21) Appl. No.: 17/509,456

(22) Filed: Oct. 25, 2021

(51) Int. Cl.
*B25J 15/00* (2006.01)
*B25J 9/14* (2006.01)
*B25J 15/08* (2006.01)

(52) U.S. Cl.
CPC ............... *B25J 15/08* (2013.01); *B25J 9/142* (2013.01); *B25J 15/0023* (2013.01); *B25J 15/0028* (2013.01)

(58) Field of Classification Search
CPC ........ B25J 15/08; B25J 15/10; B25J 15/0023; B25J 15/0028; B25J 9/142
USPC ................................................ 294/196, 198
See application file for complete search history.

(56) References Cited

U.S. PATENT DOCUMENTS

| | | | | |
|---|---|---|---|---|
| 3,318,629 | A * | 5/1967 | Brandt, Jr. ............. | A01D 46/26 294/902 |
| 3,343,864 | A * | 9/1967 | Baer ....................... | B25J 15/12 92/92 |
| 8,240,729 | B2 * | 8/2012 | Vittor ..................... | B25J 15/02 294/86.4 |
| 8,651,543 | B2 * | 2/2014 | Matsuoka ............... | B25J 15/12 294/192 |
| 11,426,882 | B2 * | 8/2022 | Takahashi ............... | B29C 39/26 |
| 2014/0265401 | A1 * | 9/2014 | Allen Demers ..... | B25J 15/0266 294/201 |
| 2019/0217482 | A1 * | 7/2019 | Ishida .................. | B25J 15/0028 |
| 2020/0055197 | A1 * | 2/2020 | Chavan Dafle ...... | B25J 15/0023 |
| 2020/0215701 | A1 * | 7/2020 | Takahashi ............... | B25J 15/12 |
| 2024/0157576 | A1 * | 5/2024 | Smith .................. | B25J 19/0004 |

* cited by examiner

Primary Examiner — Paul T Chin
(74) Attorney, Agent, or Firm — BakerHostetler

(57) ABSTRACT

A gripping tool includes first and second fingers coupled to a base member such that a distance between the first and second fingers is adjustable. First and second grippers are attached to the first and second fingers, respectively. The first and second grippers each have a compliant gripping surface and are each selectively expandable so as to reduce the distance and grip select portions of an item. A first actuator is operatively coupled to the first gripper and is configured to selectively expand the first gripper in a first direction. A second actuator is operatively coupled to the second gripper and is configured to selectively expand the second gripper in a second direction. At least one of the first and second actuators is configured to vary an expansion force of the respective first gripper in the first direction or the second gripper in the second direction.

20 Claims, 9 Drawing Sheets

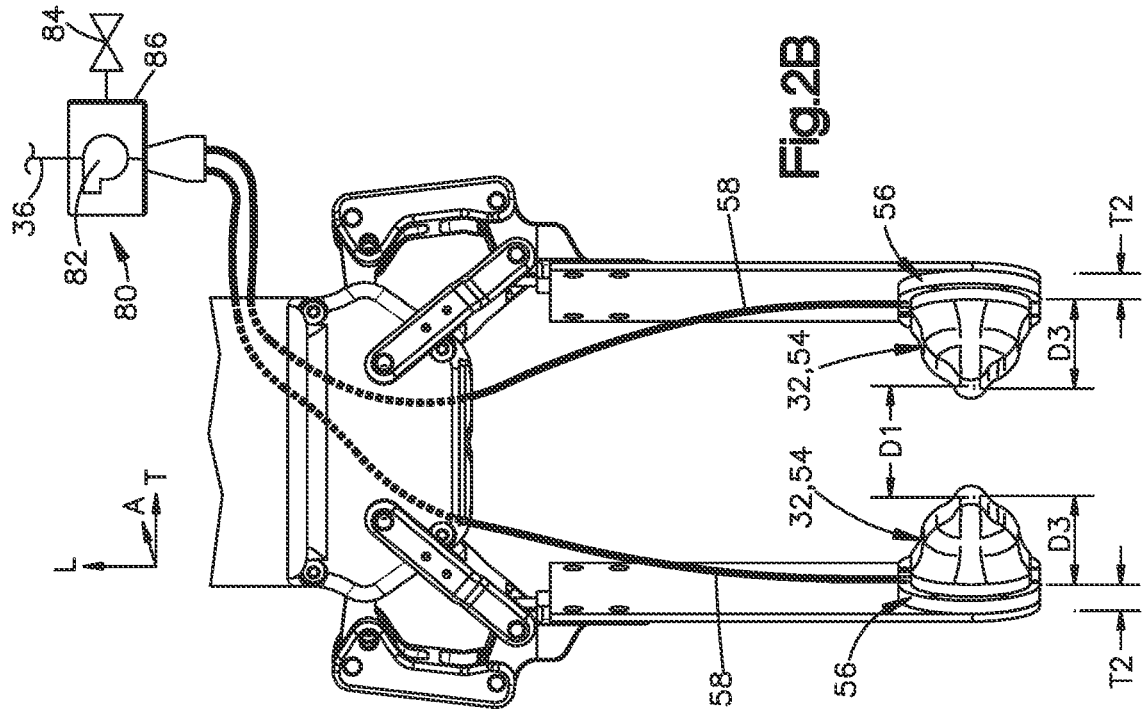
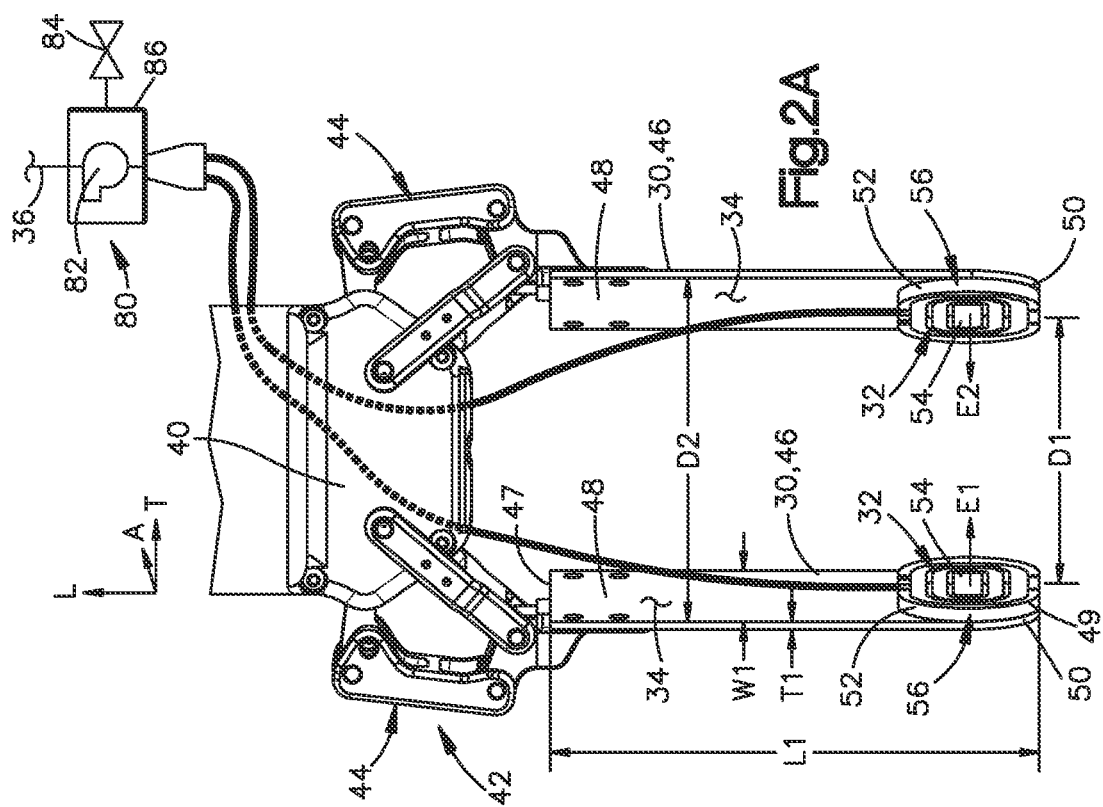

US 12,162,139 B1

GRIPPING TOOL WITH EXPANDABLE, COMPLIANT GRIPPERS, AND RELATED SYSTEMS AND METHODS

BACKGROUND

The present invention relates to automated order fulfilment, and more particularly to tools for engaging and lifting various items via expandable grippers.

In a materials handling facility, such as an order fulfilment center, multiple customer orders are received, where each order specifies one or more items from inventory to be shipped to the customer that submitted the order. To fulfill the customer orders, the one or more items specified in each order may be retrieved, or picked, from inventory (which may also be referred to as stock storage) in the materials handling facility. Under direction of a control system, picked items may be singulated and then packed into customer containers on a conveyance mechanism that routes the items to particular destinations, such as sorting stations, in accordance with the customer orders currently being processed. At the sorting station, the items can be directed "downstream" via another conveyance mechanism to an order processing station, where, for example, multiple containers for the same order are combined for delivery or shipping to the customer.

Autonomous or semi-autonomous mechanisms for picking and/or packing items can face challenges at stations in high-volume materials handling facilities, particularly when handling (e.g., picking and/or packing) items having varying sizes, shapes, rigidities, and surface irregularities (e.g., porosity). One category of items that presents such challenges involves the handling of food products (e.g., groceries). The robotics field has developed many tools for engaging and lifting items at the end of an end effector, which can also be referred to as an "end-of-arm-tool" (EOAT). For example, end effectors sometimes employ finger grippers, suction grippers, expandable grippers, or other techniques for engaging one or more surfaces of an item with sufficient gripping force to reposition the item. However, end effectors have some limitations, particular in regards to gripping a large variety of items of varying size, shape, rigidity, and surface contour with sufficient gripping force to lift and/or move the item but also with sufficient gentleness to avoid damaging items that are soft, brittle, fragile, and the like, which are common qualities of various food products.

BRIEF DESCRIPTION OF THE DRAWINGS

The foregoing summary, as well as the following detailed description of illustrative embodiments of the present application, will be better understood when read in conjunction with the appended drawings. For the purposes of illustrating the features of the present application, there is shown in the drawings illustrative embodiments. It should be understood, however, that the application is not limited to the precise arrangements and instrumentalities shown. In the drawings:

FIGS. 2A-2C are views of the end effector illustrated in FIG. 1; FIG. 2A is a perspective view showing the expandable grippers in a neutral configuration; FIG. 2B is a perspective view showing the expandable grippers in an expanded configuration; FIG. 2C is a plan diagram view showing the expandable grippers engaging an item;

FIG. 3B shows the actuator maintaining the expandable gripper in the neutral configuration; FIG. 3C shows the actuator maintaining the expandable gripper in the expanded configuration;

DETAILED DESCRIPTION

The embodiments disclosed herein pertain to gripping tools that employ finger grippers with side-mounted, expandable, compliant gripping surfaces. These grippers provide finely-controlled size adjustment to accommodate items of varying size while also providing sufficient lateral gripping force and shape conformity to grip and lift items of various weight, shape, rigidity, surface contour, and fragility without damaging the item. The grippers described herein can be particularly advantageous for picking and packing food products, although it should be appreciated that these grippers can be employed to handle a wide variety of other items. With reference to food products, the foregoing combination of gripping features also allows the grippers to successfully lift and move a wide variety of challenging food products that other grippers (such as vacuum grippers and conventional finger grippers) are incapable of handling with consistent results. Examples of such challenging products include: hinged lid produces (e.g., egg cartons, berry cartons, and the like), triangular top products (e.g., milk cartons, juice cartons, and the like), bunched produce (e.g., bunched asparagus, broccoli, lettuce, and the like), and large, uneven, and/or irregular products (e.g., pineapple, head cabbage, head lettuce, choy, and the like).

Figure 1:
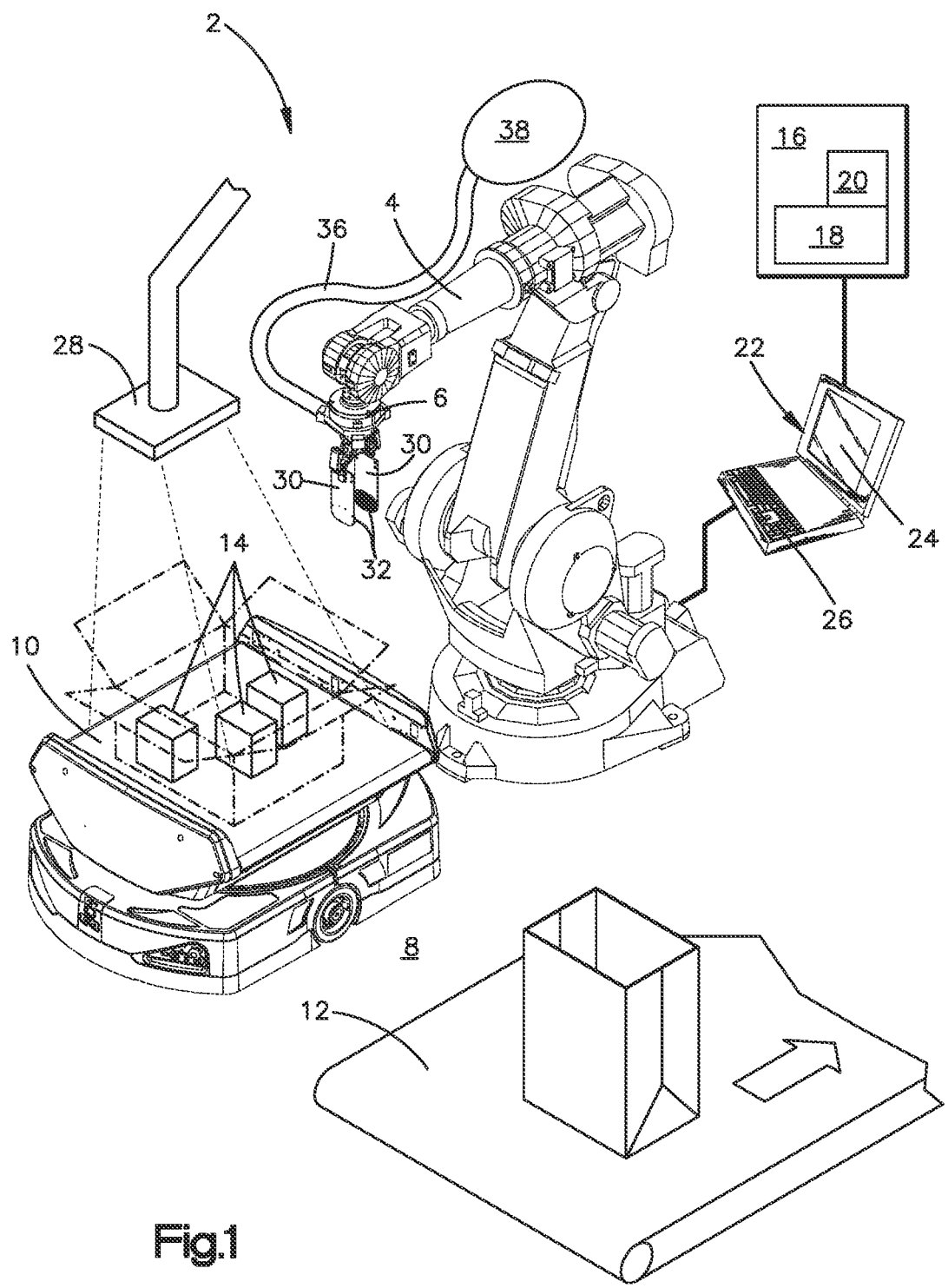
FIG. 1 is a diagram of an item-handling system having a robot arm that employs an end effector having expandable grippers for gripping various items, according to an embodiment of the present disclosure.

Referring to FIG. 1, an automated system 2 for handling items includes a robotic arm 4 that carries a gripping tool, such as an end effector 6 having adjustable grippers 32, for manipulating (e.g., gripping, lifting, and moving) items 14. The robotic arm 4 is positioned at an item processing station 8, which includes at least one inbound conveyor 10 and at least one outbound conveyor 12. The robotic arm 4 can be a multi-axis robot (such as 2-axis, 3-axis, 4-axis, 5-axis, 6-axis, 7- or more-axis robot) for providing precise movement of the end effector 6 between various positions at the item processing station. The robotic arm 4 can also be configured as a "collaborative robot" or "cobot," meaning a robot configured to interact with one or more human item handlers or operators in a shared space. The inbound conveyor 10 delivers the items 14 to a staging location of the item processing station 8 from an upstream location, such as from inventory or from an intermediate processing station, for example. The staging location can be a pick location, for example. The robotic arm 4 locates and grips the target items 14 with the end effector 6 at the staging location (e.g., one at a time or in groups) and transfers the items 14 to a second staging location, such as a packing location that can include a container or package for aggregating items 14 of a customer order, for example. The robotic arm 4 and end effector 6 can place the picked item 14 directly in the package. The second staging location (e.g., packing location) can optionally be on the outbound conveyor 12, which subsequently delivers the items to a downstream station, such as an order processing station (e.g., packing station). As shown, the inbound conveyor 10 can be a shuttle, such as a mobile robotic shuttle, and the outbound conveyor 12 can be a belt conveyor. However, it should be appreciated that various other types of mechanical conveyors can be employed for the inbound and outbound conveyors 10, 12.

The system 2 includes a control unit 16 in communication with the robotic arm 4 for controlling operation of the robotic arm 4 and the end effector 6 for manipulating items 14. The control unit 16 includes a processor 18 configured to execute computer readable instructions stored in computer memory 20. The control unit 16 is also preferably adapted to receive input from a human operator at operator kiosk 22, which can include a user interface for presenting and receiving information from a user. For example, the kiosk 22 can include a display 24, such as a monitor, for presenting information to the operator, and inputs 26, such as buttons and/or a keyboard, allowing the user to affect operation of the robotic arm 4, the inbound conveyor 10, and the outbound conveyor 12 as needed.

The system 2 includes one or more item sensors 28 for identifying characteristics of the items 14 on the inbound conveyor 10, such as item identification, position, and orientation, by way of non-limiting examples. The one or more item sensors 28 can include an image sensor, such as a camera or a CMOS image sensor, that transmits images of each item 14 to the processor 18, which can execute image recognition algorithms to identify each item 14 and its position and orientation on the inbound conveyor 10. In this manner, the image sensor and processor 18 can also identify target areas of the item 14 for gripping with the end effector 6. The one or more sensors 28 can optionally include a scanner, such as a laser scanner or image scanner, that is configured to scan a barcode or other type of identification tag placed on the items 14. In such embodiments, the processor 18 can be configured to associate the identification of each item 14 from the scanner and then employ the image sensor to identify the item position, orientation, and target areas for gripping. It should be appreciated that other techniques for identifying characteristics of the items 14 for controlled gripping thereof with the end effector 6 are within the scope of the present embodiments.

The end effector 6 includes a plurality of adjustable fingers 30 that carry a plurality of expandable grippers 32. In the illustrated embodiment, the end effector 6 has two (2) fingers 30, each carrying an expandable gripper 32. In other embodiments, the end effector 6 can include three (3) or more fingers 30, any one of which can include one or more expandable grippers 32. The fingers 30 are position-adjustable for placement adjacent a target item 14. In the depicted two-finger 30 embodiment, the fingers 30 are preferably configured for placement at opposite sides of the item 14. The grippers 32 are mounted on in-board surfaces 34 of the fingers 30 and are configured to expand inwardly therefrom and into engagement with respective surfaces of the target item 14. The fingers 30 include actuators (shown in FIGS. 3B-3C) for controlling expansion and retraction of the grippers 32, as described in more detail below. In the example embodiments illustrated herein, the grippers 32 include a compliant (i.e., flexible) material that is expandable via inflation, as controlled by the respective actuator. Accordingly, the robotic arm 4 can include one or more primary fluid conduits 36 that provide fluid communication between a fluid reservoir 38 and the end effector 6. It should be appreciated, however, that other types of expandable, compliant grippers are within the scope of the present disclosure.

Figure 2C:
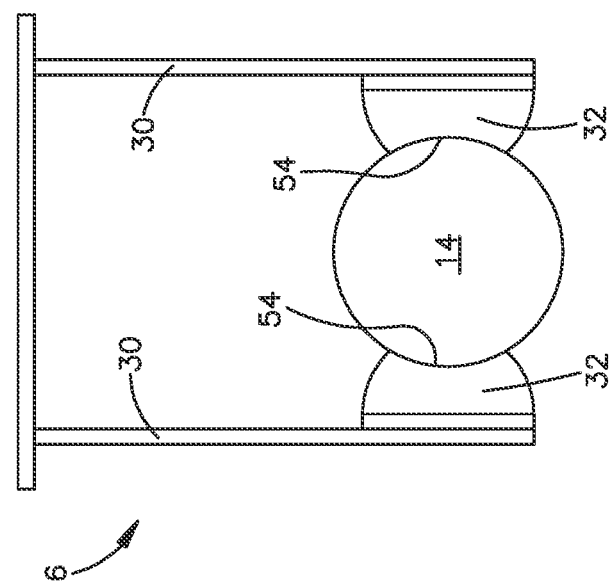

Referring now to FIGS. 2A-2C, the end effector 6 includes a base member 40 that carries a finger adjustment mechanism 42 for controlling movement of the fingers 30. The finger adjustment mechanism 42 can include a plurality of linkages 44, such as a first linkage 44 that operatively couples a first finger 30 to the base member 40 and a second linkage 44 that operatively couples the second finger 30 to the base member 42. As shown, each linkage 44 can include a four-bar mechanism, although other linkage types are within the scope of the present embodiments.

The fingers 30 of the gripper 6 each include a finger body 46 and a mount 48 for coupling the finger body 46 to the respective linkage 44. It should be appreciated that FIGS. 2A-2B show the fingers 30 in a parallax view for illustrative purposes. As shown, the finger bodies 46 can have a plate-like geometry. Thus, the finger bodies 46 can also be referred to as "plate bodies" 46 (e.g., first and second plate bodies 46). The first and second finger bodies 46 are preferably rectangular and have rounded distal edges 50 to avoid unwanted contact with adjacent items 14 in close proximity to the target item 14. Each plate body 46 defines a length L1, as measured between a proximal end 47 and a distal end 49 of each plate body 46 along a longitudinal direction L. Each plate body 46 also defines a width W1 along a lateral direction A that is perpendicular to the longitudinal direction L, and a thickness T1 along a transverse direction T that is perpendicular to the longitudinal and lateral directions L, A. The thickness T1 is preferably narrow, which is critical in picking and/or packing operations that require gripping items 14 in close proximity to other items 14. For example, the plate thickness T1 can be in a range from about 3.0 mm to about 12 mm.

In the illustrated two-finger 30 example, the finger bodies 46 are preferably positioned directly opposite each other along the transverse direction T and extend parallel with each other. The linkages 44 are configured to adjust an opening distance D1 between the grippers 32 along the transverse direction T, as needed for positioning the finger bodies 46 on opposite sides of the target item 14. As shown, the opening distance D1 can be adjusted by adjusting a finger spacing distance D2 between the finger bodies 46, which can also be referred to as a "stroke distance" of the fingers 30. The finger spacing distance D2 can be measured between the in-board surfaces 34 along the transverse direction T. In the illustrated example, the base member 40 and linkages 44 employ those of the Robotiq 2F-85 parallel gripper, produced by Robotiq Inc of Levis, Quebec, Canada, while the fingers 30 are adapted to have the narrow profile (i.e., narrow thickness T1) necessary for gripping items 14 in closely bunched clusters or "clutter" while having a sufficient lateral width W1 for supporting expandable grippers 32. It should be appreciated, however, that various other designs, models, and configurations of the base member 40 and/or linkages 44 are within the scope of the present disclosure.

The opening distance D1 can also be adjusted by expanding the grippers 32. Each of the finger bodies 46 carries at least one expandable gripper 32 coupled to a respective actuator 56. As shown, the first finger body 46 carries a first gripper 32 and the second finger body 46 carries a second gripper 32. Each of the first and second grippers 32 has a compliant gripping surface 54 that is configured to expand inwardly to reduce the opening distance D1. Thus, the compliant gripping surface 54 of the first gripper 32 is expandable from a neutral configuration (FIG. 2A) to an expanded configuration (FIG. 2B) along a first expansion direction E1 and the compliant gripping surface 54 of the second gripper 32 is expandable along a second expansion direction E2 that is opposite the first expansion direction E2. It should be appreciated that, in the present embodiment, the first and second expansion directions E1, E2 are each mono-directional components of the transverse direction T, which is bi-directional. The grippers 32 are preferably located at the distal ends 49 of the finger bodies 60 to allow the grippers 32 to engage items 14 near their bottoms, if desired. Accordingly, the grippers 32 can be characterized as being located at the "fingertips" of the fingers 30.

As shown in FIG. 2C, as the grippers 32 expand into engagement with the target item 14, the compliant gripping surfaces 54 are configured to substantially conform to the shape of the respective engaged surface of the item 14. In this manner, the grippers 32 provide an advantage of increasing the contact area at the interfaces between the gripping surfaces 54 and the item 14, thereby providing a more secure gripping interface. Additionally, by increasing the contact area at the gripping interface, less gripping force per unit of contact area is required to lift and/or reposition the item 14. These benefits are particularly crucial for handling items 14 that have irregular shapes, lack rigidity, or are fragile, by way of non-limiting examples.

The end effector 6 includes an actuation mechanism for controlling the finger spacing (i.e., distance D2) and the expansion of the grippers 32. For example, the actuation mechanism includes the actuators 56, which can operatively couple the grippers 32 to the finger bodies 46. In the illustrated example, the actuation mechanism includes first actuator 56 that operatively couples the first gripper 32 to the first finger body 46 and a second actuator 56 that operatively couples the second gripper 32 to the second finger body 46. Each of the first and second actuators 56 can include a gripper housing 52 attached to the in-board surface 34 of the respective finger body 46. The gripper housings 52 each define a thickness T2 in the transverse direction T, which can be in a range of about 3 mm to about 25 mm, and more particularly in a range of about 5 mm to about 15 mm, though preferably no more than about 10 mm so that the transverse footprint of the gripper remains narrow for gripping items in clutter. The narrow thicknesses T1, T2 of the plate bodies 46 and the gripper housings 52, particularly at the lower ends of their thickness ranges, allow the fingers 30 to fit between closely bunched items 14 and grip a target item 14 within the clutter. As shown in FIG. 2A, the grippers 32 are preferably flush with the innermost surfaces of the gripper housings 52 when in the neutral configuration. Thus, in such embodiments, the opening distance D1 in the neutral configuration is defined as the finger spacing distance D2 minus two-times (2×) the actuator housing thickness T2 (D1=D2−2×(T2)).

In the illustrated embodiment, the grippers 32 are expanded from the neutral configuration (FIG. 2A) to the expanded configuration (FIG. 2B) via inflation. In such embodiments, the gripper housings 52 each define an internal volume and each gripper 32 is attached in sealing engagement with the respective gripper housing 52 such that the gripper 32 encloses the internal volume, thereby providing each actuator 56 with an enclosed volume. The enclosed volume of each actuator 56 is in fluid communication with a fluid conduit 58, such as a secondary fluid conduit 58 that is additionally in fluid communication with an expansion control unit 80 of the actuation mechanism, as shown in FIG. 2B. For example, the expansion control unit 80 can include at least one pump 82 configured to deliver select amounts of pressurized fluid from the one or more primary fluid conduits 36 through the secondary fluid conduits 58 to the enclosed volumes for inflating the grippers 32, as described in more detail below.

To transition the gripper 32 to the expanded configuration (FIG. 2B), the expansion control unit 80 directs pressurized fluid into the enclosed volume of the actuator 56, which inflates the gripper 32. The inflation causes the compliant gripping surface 52 to extend from the gripper housing 52 at expansion distances D3 along the transverse direction T, thereby reducing the opening distance D1. Accordingly, the opening distance D1 of the end effector 6 can be adjusted by varying the distance D2 between the finger bodies 46 and/or by varying the expansion distances D3 as needed to achieve an optimal, or at least enhanced, gripping configuration for gripping a target item 14. The opening distance D1 can be adjustable between a range from about 0 mm to about 400 mm, and more particularly in a range from about 50 mm to about 200 mm, and more particularly in a range from about 70 mm to about 160 mm. The gripper 32 can define a maximum expansion distance D3 in a range from about 2 mm to about 100 mm, and more particularly in a range from about 20 mm to about 40 mm, and more particularly in a range from about 24 mm to about 32 mm.

The expansion control unit 80 is configured to deliver various quantities of pressurized fluid to the enclosed volumes for inflating the grippers 32 at controlled pressures, expansion distances, expansion forces, and contact force distributions as needed to grip items 14 of various size, shape, and rigidity. In this manner, the actuation mechanism is configured to inflate the grippers 32 according to desired inflation characteristics to achieve a sufficient cumulative gripping characteristic (e.g., force, contact area, and force distribution) to securely move the item 14 without damaging the item 14 or imparting unwanted effects on the item 14 or its packaging. Thus, the expansion control unit 80 can include one or more metering components configured to actively vary at least one of the amount of pressurized fluid and the specific pressure of the fluid entering the enclosed volume. The expansion control unit 80 is also configured to reduce pressure within the enclosed volumes to return the grippers 32 to the neutral configuration. For actively varying the fluid pressure during expansion, the at least one pump 82 can be a metering pump, by way of a non-limiting example. For reducing the pressure (e.g., for deflating the grippers 32), the expansion control unit 80 can include at least one exhaust valve 84 for directing the pressurized fluid away from the actuators 56.

With continued reference to FIGS. 2A-2B, in one example embodiment, the expansion control unit 80 includes a pump 82, such as a metering-pump, in communication with a pressure chamber 86. The pump 82 is configured to supply the pressurized fluid to the actuators 56 for expanding the grippers 32. The pump 82 can be located within the pressure chamber 86 or upstream from the pressure chamber 86. The pressure chamber 86 is also in fluid communication with an exhaust valve 84, such as a solenoid valve, for venting pressurized fluid from the pressure chamber 86 for returning the grippers 32 to the neutral configuration. The pressure chamber 86 is also in fluid communication with secondary fluid conduits 58 that are respectively in fluid communication with the enclosed volumes of the actuators 56. As shown, first and second secondary fluid conduits 58 extend respectively from the actuators 56 and are in common fluid communication with the pressure chamber 86. Accordingly, in this example, the secondary fluid conduits 58 communicate the pressure in common with each other, thereby simultaneously causing substantially the same level of inflation or deflation of the grippers 32. In this example embodiment, to expand (i.e., inflate) the grippers 32, the pump 82 is activated to supply pressurized fluid to the pressure chamber 86, through the secondary fluid conduits 58, and to the actuators 56. To return (i.e., deflate) the grippers 32 to their neutral configuration, the exhaust valve 84 opens to vent the pressurized fluid to atmosphere. Thus, in this example, the expansion control unit 80 employs passive inflation to return the grippers 32 from the expanded configuration to the neutral configuration. In other embodiments, however, the expansion control unit 80 can be configured to actively deflate the grippers 32. For example, the expansion control unit 80 can include a vacuum pump for supplying vacuum pressure (i.e., negative pressure) to the actuators 56 for deflating the grippers 32. It should be appreciated that the expansion control unit 80 can employ various arrangements of pumps and/or valves for controlling expansion and reduction of the grippers 32. For example, each actuator 56 can be in communication with at least one respective pump and/or at least one respective valve for controlling operation of each actuator 56 individually. It should be appreciated that various pump and/or valve configurations can be employed throughout the expansion control unit 80.

Figure 3A:
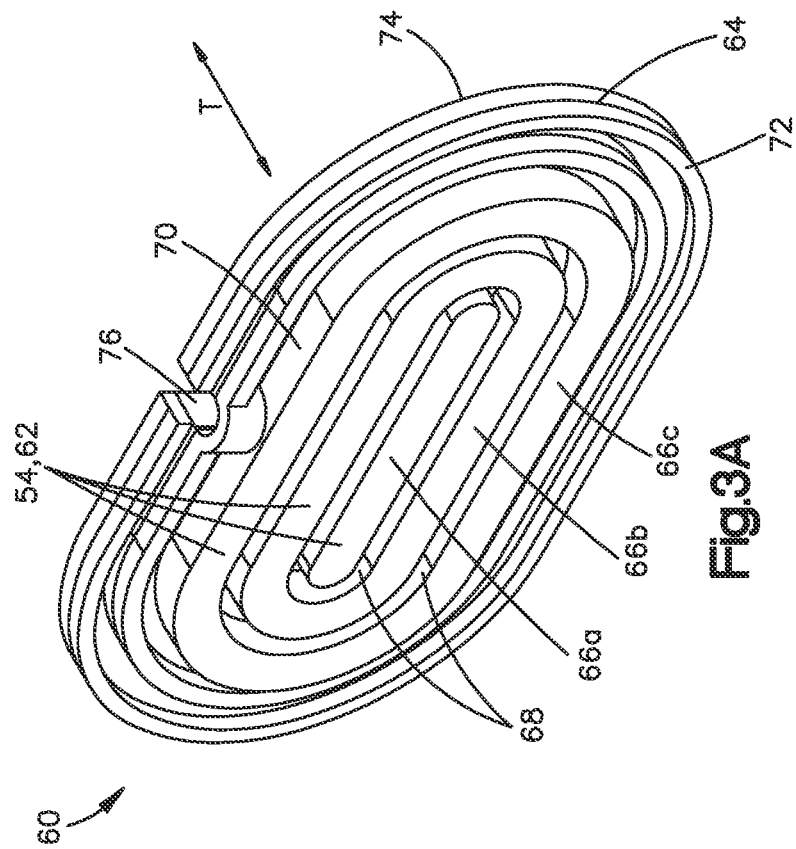
FIG. 3A is a perspective view of a compliant gripper body of the expandable grippers shown in FIGS. 2A-2C.
Figure 3C:
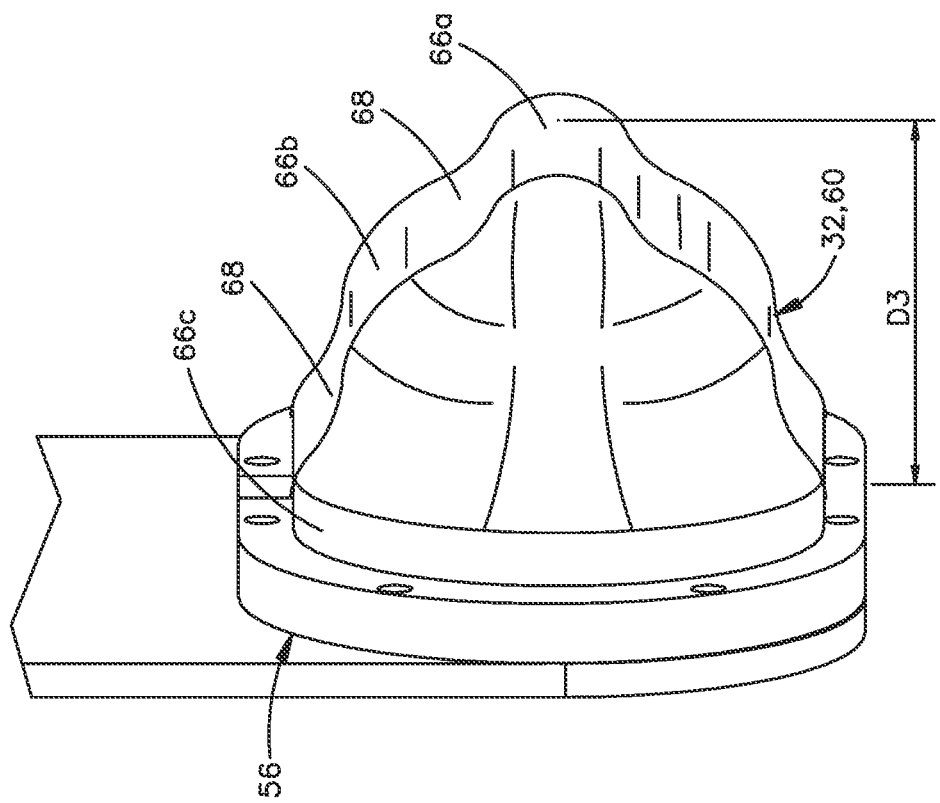
FIGS. 3B-3C are perspective views of an actuator for driving expansion of an expandable gripper as illustrated in FIGS. 2A-2C.
Figure 3B:
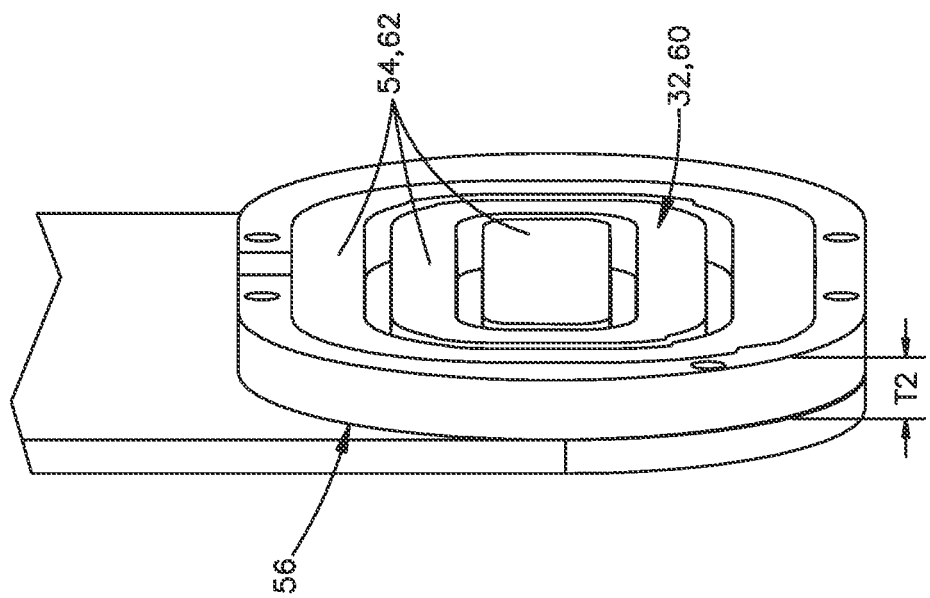

Referring now to FIGS. 3A-3C, each gripper 32 defines a gripper body 60 that is constructed of a flexible material and defines the compliant gripping surface 54 along an inner surface 62. For example, the gripper body 60 can be constructed of a rubber material, such as urethane rubber (e.g., $C_3H_7NO_2$, such as Vytaflex™ 40A brand rubber, produced by Smooth-On Inc. of Macungie, Pennsylvania, USA), neoprene, silicone, nitrile, EPDM (ethylene propylene diene monomer), styrene-butadiene rubber (SBR), butyl, and fluorosilicone rubber, although it should be appreciated that various other flexible materials can be employed. The gripper body 60 defines an outer surface 64 spaced from the inner surface 62 along the transverse direction T. The gripper body 60 can be constructed in a nested, bellows-type configuration. For example, the gripper body 60 can include a plurality of inner surface portions 66a-c, which can be concentrically arranged with respect to each other, and which can be connected to each other by a plurality of concentric interconnecting fold portions 68. In this manner, the nested, bellows-type configuration of the inner surface portions 66a-c and the interconnecting fold portions 68 allows the gripper body 60 to expand in a telescoping manner. In the illustrated embodiments, the inner surface portions 66a-c can include a center inner surface portion 66a, one or more intermediate inner surface portions 66b, and an outer inner surface portion 66c. It should be appreciated that each of the inner surface portions 66a-c and interconnecting fold portions 68 can collectively define various portions of the compliant gripping surface 54. Stated differently, the inner surface portions 66a-c and the interconnecting fold portions 68 can each contact the target item 14, depending on the item 14 shape and the gripper 32 inflation level.

The gripper body 60 includes a peripheral fold portion 70 that extends along a perimeter of the gripper body 60 and interconnects the outer inner surface portion 66c to a base portion 72 of the gripper body 60. The base portion 70 can define an outer surface 64 that can be joined to an adhesive layer 74 for sealing the base portion 72 to the gripper housing 52 in air-tight fashion. As shown in FIG. 3A, one or both of the base portion 72 and the adhesive layer 74 can define an aperture 76 for providing fluid communication between the secondary fluid conduit 58 and the enclosed volume of the gripper 32. As shown in FIGS. 3B-3C, during gripper expansion, the center inner surface portion 66a can extend furthest from the gripper housing 52. Therefore, the expansion distance D3 of the gripper 32 can be defined between the center inner surface portion 66a and the gripper housing 52. These figures also demonstrate the telescoping nature of the inner surface portions 66a-c during gripper 32 expansion according to the illustrated example of the gripper 32. In other embodiments, however, the gripper 32 need not employ nested or telescoping portions. It should be appreciated that the gripper bodies 60 illustrated herein represent non-limiting examples of suitable expandable gripper body 60 geometries. A wide variety of gripper body 60 geometries for providing expandable, compliant outer gripping surfaces 64 are within the scope of the present disclosure.

One advantage of the end effectors 6 described herein is that the fingers 30 and grippers 32 offer various controllable mechanisms for providing tailored gripping engagements. For example, the inflation pressure of the grippers 32 can be adjusted as needed during a pick, which can affect the expansion distance D3 of the grippers 32 and also the expansion forces at the contact interfaces with the item 14. Moreover, the plate separation distance D2 can also be adjusted to cause favorable gripping parameters, such as the total contact area between the grippers 32 and the item 14. For example, to achieve a higher contact area that more widely distributes the contact force along the item 14 (such as for fragile or irregularly shaped items), the control unit 16 can employ a narrower finger spacing distance D2 that places the neutral grippers 32 closer to the item 14. At this reduced finger spacing distance D2, the grippers 32 can conform to the item 14 along increased contact areas, thereby also distributing the contact forces over a greater area of the item 14. This can allow the grippers 32 to engage an item 14 using lower inflation pressures without compromising overall gripping force. Stated differently, the fingers 30 and grippers 32 can be cooperatively controlled to enhance the distribution of contact forces along the item 14, thereby adapting as needed based on the characteristics of the target item 14 (e.g., shape, rigidity, durability, surface irregularities (e.g., porosity)). Furthermore, the compliant nature of the gripper bodies 60 allows the fingers 30 to grip select target items 14 even without expanding the grippers 32, which can be advantageous when gripping select items 14 within clutter without disturbing the adjacent items.

Figure 4B:
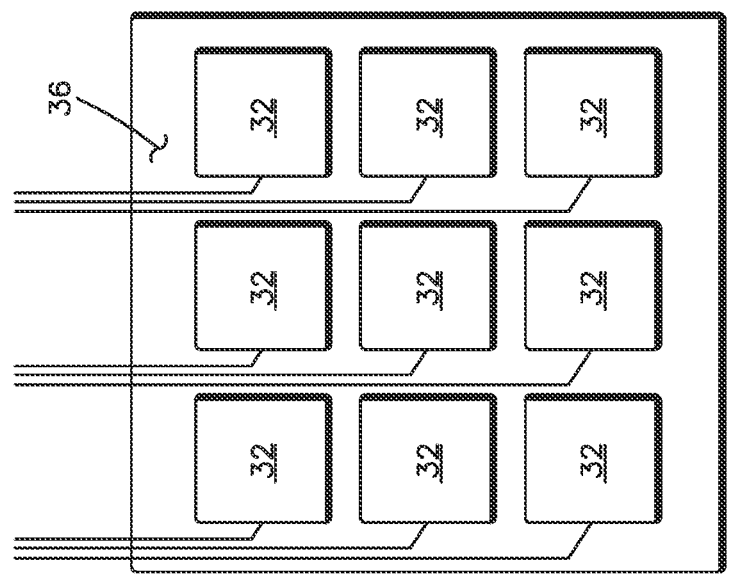
FIG. 4B is a front plan view of a finger illustrated in FIG. 4A carrying multiple expandable grippers, according to an embodiment of the present disclosure.
Figure 4A:
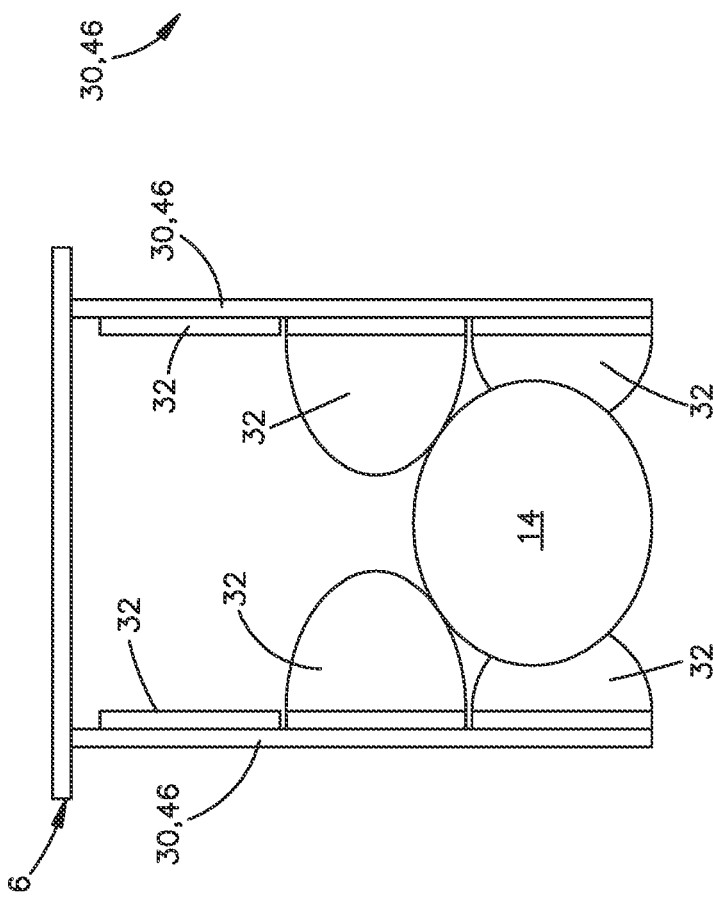
FIG. 4A is a plan elevation of an end effector having fingers that each carry multiple expandable grippers, according to another embodiment of the present disclosure.

It should also be appreciated that the particular finger and gripper configurations described above are provided as non-limiting examples of end effectors that employ expandable grippers located on fingers. Various other finger and expandable gripper configurations are within the scope of the present disclosure. For example, referring now to FIGS. 4A-4B, in additional embodiments, the end effector 6 can be configured such that one or more of the finger bodies 46 carries a plurality of expandable grippers 32, which can be arranged in a patterns along the in-board surfaces 34. Thus, each finger body 46 can be characterized as having an array of grippers 32 (which can also be referred to as a "multi-gripper array"). The expandable grippers 32 of such embodiments can be configured similarly to those described above, though the size and dimensions thereof can be adjusted to fit multiple grippers 32 on a finger 30. In such multi-gripper arrays, the grippers 32 within each array can be independently controllable, such as to vary the expansion qualities of the multi-gripper array as desired to form a beneficial collective gripping profile against the item 14. Although the grippers 32 of each finger 30 shown in FIGS. 4A-4B are depicted as arranged in a 3×3 array, it should be appreciated that the gripper 32 of a multi-gripper array can be arranged in various other patterns and gripper quantities. Moreover, various grippers 32 within each array can have different sizes and configurations.

It should also be appreciated that, in additional embodiments, the end effector 6 can include more than two (2) fingers 30 that carry one or more expandable grippers 32. In such embodiments, the fingers 30 can be arranged in various patterns and can have various geometries. For example, an end effector 6 can have three (3) fingers arranged at 120-degree intervals about a central vertical axis of the end effector, or can have four (4) fingers (e.g., arranged at 90-degree intervals about the central axis, or arranged in two (2) side-by-side facing each other), or can have more than four (4) fingers. Furthermore, in yet other embodiments, an end effector can employ two (2) fingers with expandable grippers 32 and one or more additional fingers devoid of expandable grippers.

Test Results:

The end effector 6 of the illustrated embodiment was subjected to a series of tests to evaluate gripping parameters and efficacy of the illustrated embodiment of the end effector 6 shown in FIGS. 1-3C. These tests will now be described with reference to FIGS. 5A-7C.

Figure 5B:
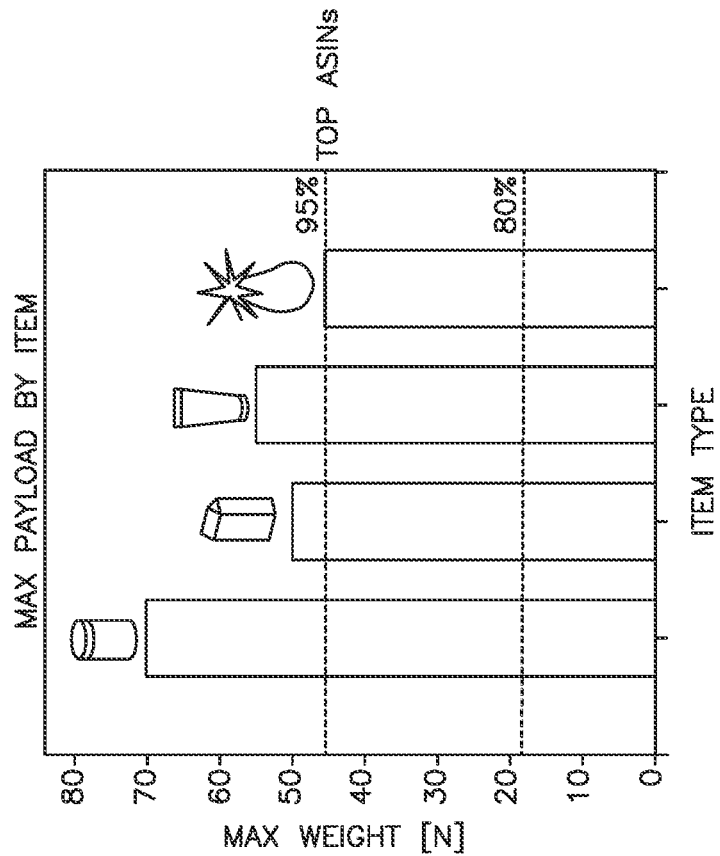
FIG. 5B is a chart showing test results of the end effector gripping strength on various food products.
Figure 5A:
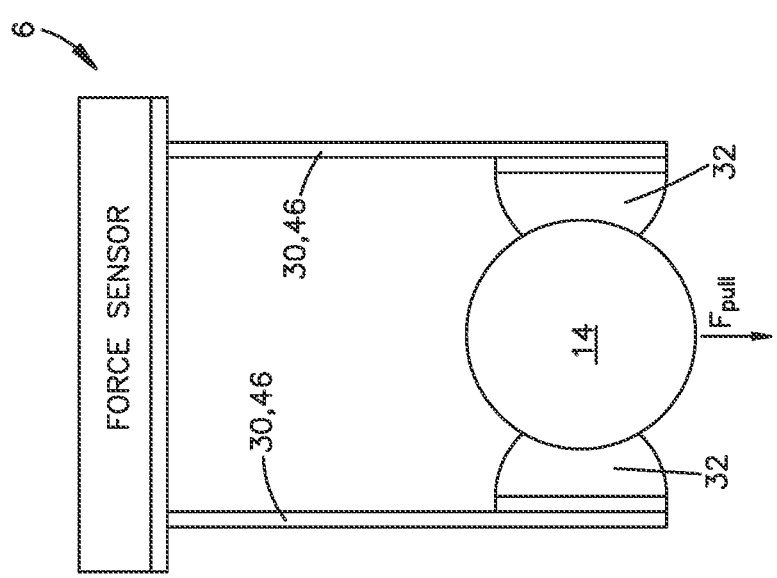
FIG. 5A is a diagram of a test arrangement for testing the gripping strength of the end effector illustrated in FIGS. 2A-2C.

Referring now to FIGS. 5A-5B, weight limit tests were performed on various items 14, particularly items representing challenging food products, including: (1) a pineapple; (2) a bag of pinto beans having a net weight of 16 ounces; (3) a carton of Goldfish Crackers (by Pepperidge Farms) having a new weight of 31 ounces; and (4) a jar of Espresso Style Instant Coffee (by Café Bustelo) having a net weight of 7.05 ounces. The test arrangement is shown in FIG. 5A, in which each of these items 4 was gripped and suspended by the expanded grippers 32 and were then pulled at various constant downward forces Fruii until the item 14 slipped along (or from) the grippers 32. The downward forces Fruii were added to the measured weight of each item to calculate the maximum weight of each item type that could be lifted by the end effector 6. The results are shown in FIG. 5B, which shows that the grippers 32 can lift: (1) a pineapple weighing up to about 4.5 Newtons (N), or about 4.6 Kilogram-Force (kgf); (2) a bag of pinto beans up to about 55 N, or about 5.6 kgf, (3) a carton of goldfish crackers up to about 50 N, or about 5.1 kfg; and (4) a jar of instant coffee up to about 70 N, or about 7.1 kfg. Thus, the grippers 32 were able to lift all the tested items 14 weighing up to about 4.5 kg, which represents about 95% of the top selling AMAZON-FRESH™ products currently sold by Amazon Technologies, Inc. The inventors therefore estimate that the grippers 32 described herein can reliably pick and pack about 95 percent of top selling AMAZONFRESH™ food products.

Figure 6C:
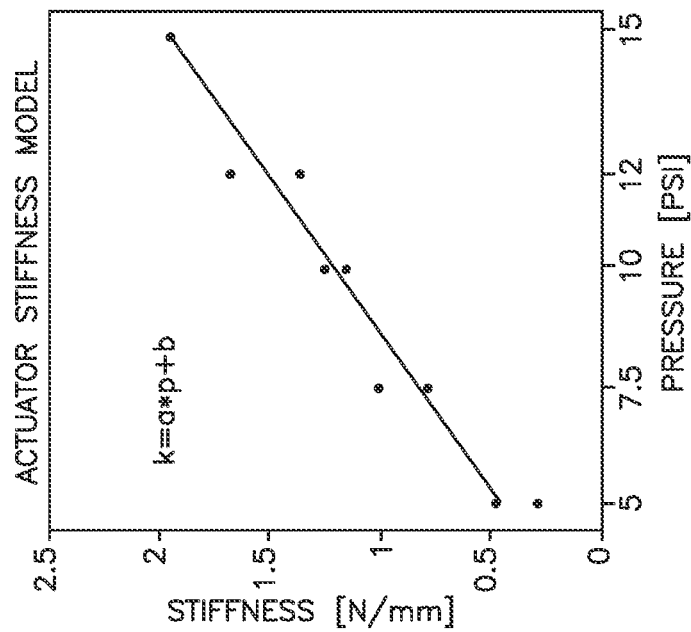
FIG. 6C is a chart showing test results obtained from the test arrangement illustrated in FIG. 6B.
Figure 6B:
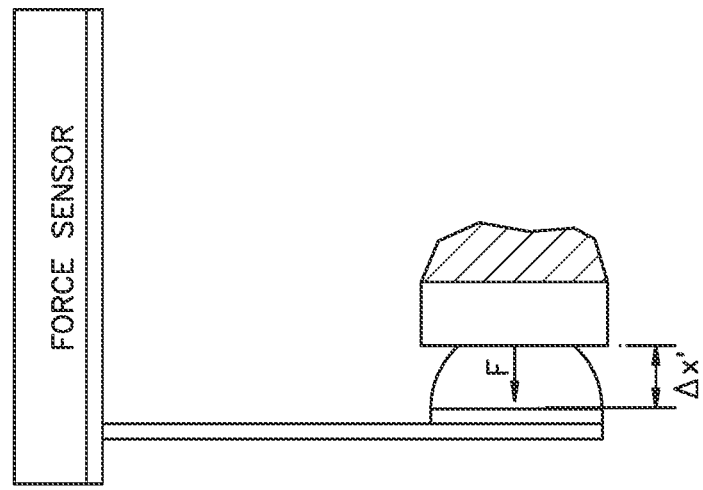
FIG. 6B is a diagram of a test arrangement for evaluating force characteristics of the grippers at various pressures.
Figure 6A:
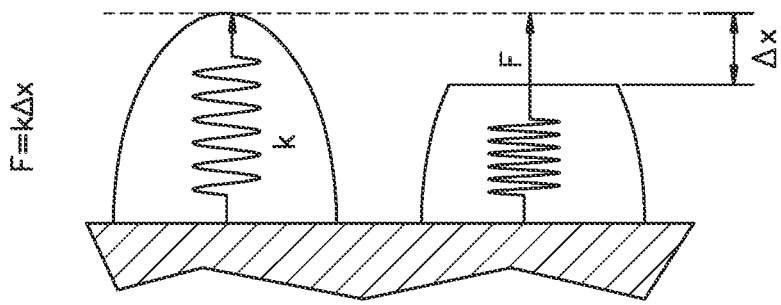
FIG. 6A a diagram showing a model for using spring characteristics to estimate force parameters for the grippers illustrated in FIGS. 2A-3C.

Referring now to FIGS. 6A-6C, the grippers 32 were also evaluated to understand the force characteristics imparted by the grippers 32 against various item 14. For example, referring now to FIG. 6A, the inventors employed principles for spring characteristics, such as the known relationships between spring force (F), spring strain or deformation ($\Delta x$), and spring constant (k, also known as the "stiffness" constant), including the equation $F=k\Delta x$, also known as "Hooke's Law," to model the force characteristics of the grippers 32. Using such spring characteristics, the inventors created a model that approximated the grippers 32 as virtual springs, in which the stiffness (e.g., spring constant, k) varied in proportion to the pressure applied to the grippers. The inventors' model calculated that the grippers 32 possessed linear proportionality between applied pressure (p) and stiffness (k). This model is depicted as the straight line shown in FIG. 6C.

Referring now to FIG. 6B, to evaluate the aforementioned model, the inventors arranged a test to evaluate the stiffness of the grippers 32 based on force measurements taken at various applied pressures. In these tests, a finger 30 of the end effector 6 was located adjacent a fixed surface and a known pressure (p) was applied by the actuator 56 to expand the gripper 32, which in turn caused the finger 30 to move away from the fixed surface at an expansion distance ($\Delta x$). The expansion distance ($\Delta x$) was measured at each applied pressure (p), which included pressures of 5 pounds per square inch (psi), 7.5 psi, 10 psi, 12 psi, and 15 psi. Additionally, the finger 30 was connected to a force sensor, which measured the force (F) when the finger 30 arrived at the maximum expansion distance ($\Delta x$) for each tested pressure (p). Referring now to FIG. 6C, the test data was plotted (shown as circular plot points) by dividing the normal force measured by a normalized deformation where the resting state of each spring was the measured maximum expansion distance ($\Delta x$) of the gripper 32 for that given pressure (p). The results show that the model (the straight line) is indeed an accurate approximation to the normal forces (F) exerted by the grippers 32 and that the relationship between stiffness of the virtual spring (i.e., the actuators 56) for the measured range was linear. The model is expected to help efficiently tune gripping parameters for various food products based on item characteristics, such as weight, by way of a non-limiting example.

Figure 7A:
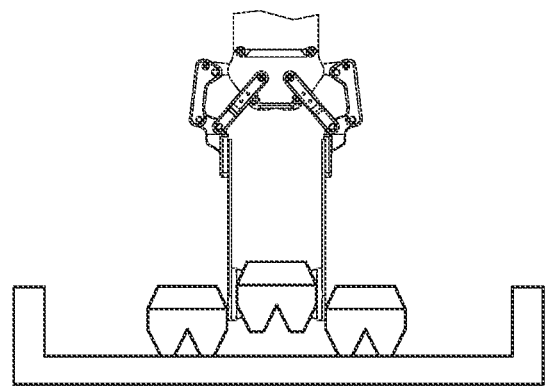
FIGS. 7A-7C are photographs showing active tests of the end effector illustrated in FIGS. 2A-2C lifting and moving various food products.
Figure 7B:
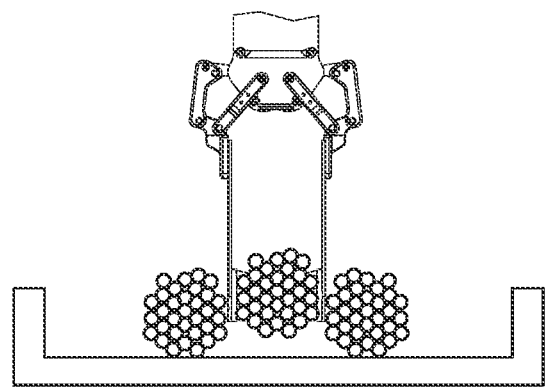
Figure 7C:
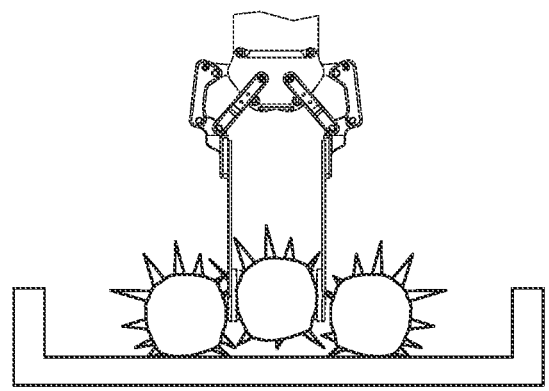

Referring now to FIGS. 7A-7C, to further test the end effector 6 efficacy at picking challenging food products, the inventors mounted the end effector 6 on a Universal Robot and manually commanding positions and pick points for various items 14, including bagged crackers, egg cartons (FIG. 7A), bunched asparagus (FIG. 7B), and pineapples (FIG. 7C), each item being bunched or cluttered with like items in close proximity. The end effector controls were also integrated with the perception and path planning of the Amazon Fresh robotic picking station to evaluate the end effector performance using automated picking and placing of the food products. The end effector 6 was successfully able to lift each of these items 14 from a first location (also known as picking location) and transfer and place the item at a second location (i.e., a packing location). It was observed that the narrow thicknesses T1, T2 of the plate bodies 46 and the gripper housings 52 allowed the fingers 30 to fit between the closely bunched items 14 to grip the target item 14. It was also observed that the compliant grippers 32 were able to conform the shape of the items 14 and apply sufficient contact forces to pick and pack the items 14, yet while distributing the contact forces over the contact areas so as to avoid damaging or otherwise disturbing the condition or presentation of the items 14.

In summary, the end effector 6 was able to lift and transfer a wide variety of challenging food products in a picking and packing environment. The actuators 56 were able to lift products weighing up to about 70 N, or about 7.1 kfg, which is up to about 300 times (300×) their own weight. It was observed that the narrow thicknesses T1, T2 of the plate bodies 46 and the gripper housings 52 allowed the fingers 30 to fit between the closely bunched test items 14 to grip the target item 14. It was also observed that the compliant grippers 32 were able to conform to the shape of the items 14 and apply sufficient contact forces to pick and pack the items 14, while also distributing the contact forces over adjustable contact areas so as to avoid damaging or otherwise disturbing the condition or presentation of the items 14. Based on the test results described herein, the inventors expect that the end effectors 6 described herein can improve the percentage of AMAZONFRESH™ products that can be picked and packed autonomously (via robotic arm) from about 90 percent to about 95 percent, which represents significant improvements in food product fulfillment efficiency.

Figure 8:
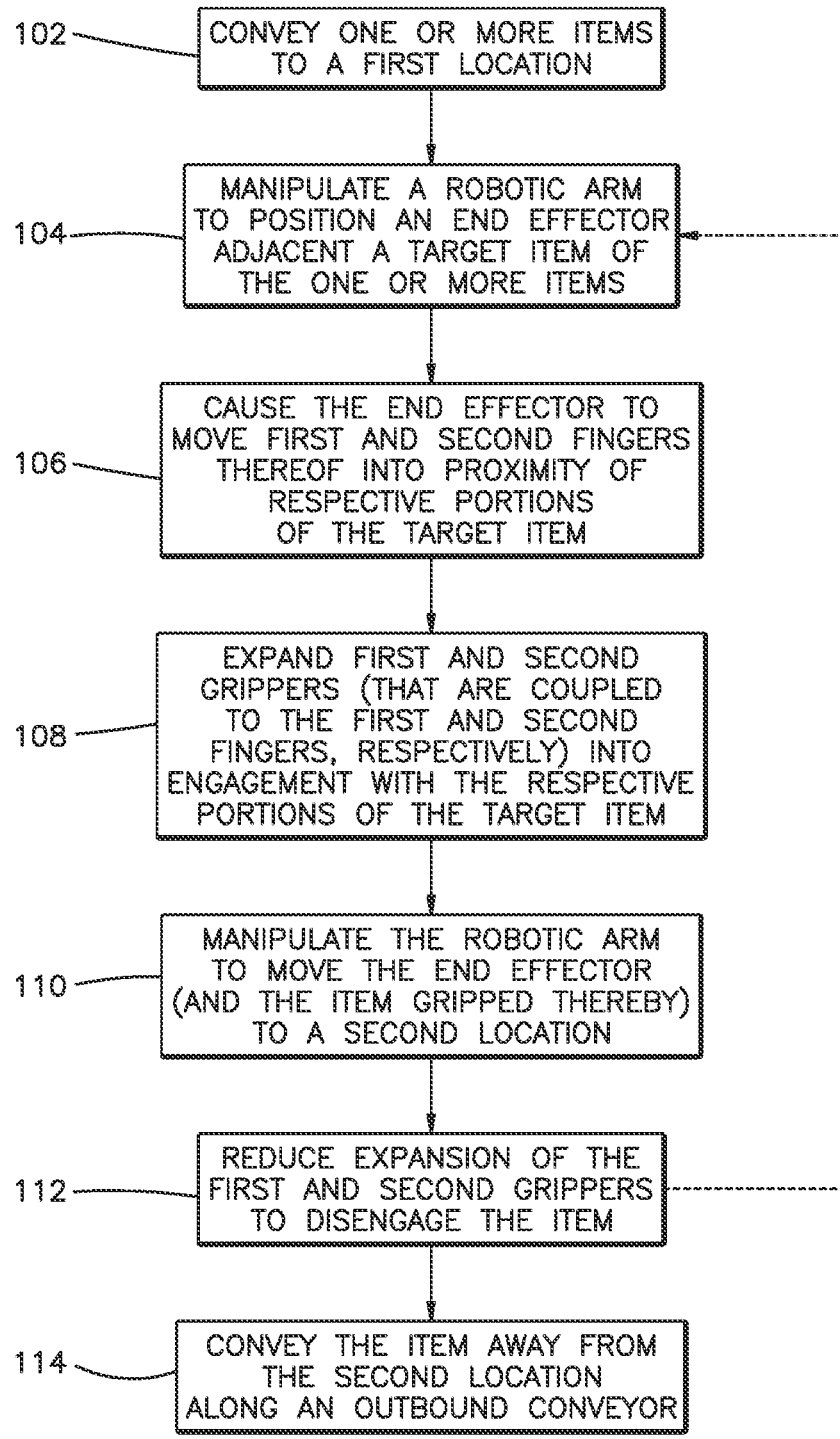
FIG. 8 is a diagram of a process for picking and packing items using the item-handling system illustrated in FIG. 1.

Referring now to FIGS. 1 and 8, an example method of operating the system 2 for moving, "picking", lifting, packing, and/or sorting various items 14 will now be described.

At step 102, one or more items 14 are conveyed to an item processing station 8, such as along an inbound conveyor 10. During step 102, the inbound conveyor 10 can convey the one or more items 14 to a first location, such as a staging location (e.g., a picking location), at the item processing station 8. The inbound conveyor 10 can convey the one or more items 14 within a container, such as an inventory container (e.g., a box or other package containing a quantity of fungible items 14).

At step 104, a robotic arm 4 is manipulated to position an end effector 6 adjacent a target item 14 of the one or more items 14 at the first location (e.g., picking location).

At step 106, the end effector, under control of a control unit having a processor executing computer readable instructions stored in computer memory, moves first and second fingers 30 of the tool 6 into proximity of respective first and second target portions of the target item 14. Step 106 can include a sub-step of varying a distance D2 between the first and second fingers 30. The target portions of the item 14 can be on opposite sides of the item 14. Thus, the sub-step of varying the distance D2 can include determining a preferred distance D2 to achieve beneficial gripping characteristics during subsequent steps.

At step 108, the control unit expands a first gripper 32 coupled to the first finger 30 into engagement with the first portion of the target item 14. Step 108 also includes expanding a second gripper 32 coupled to the second finger 30 into engagement with the second portion of the target item 14. Step 108 includes a sub-step of controlling at least one gripping characteristic, such as at least one of a gripping surface area, a gripping force, and a gripping force distribution (e.g., force per unit of contact area) of at least one of the first and second grippers 32 at an interface with the respective portion of the target item 14. Step 108 can include additional sub-steps of directing a pressurized fluid into a first volume at least partially defined by the first gripper 32 and directing a pressurized fluid into a second volume at least partially defined by the second gripper 32. These sub-steps of step 108 can each further include sub-steps of metering the pressurized fluid into the first and second volumes from a reservoir of the fluid.

At step 110, the robotic arm 4 is manipulated to move the tool 6 to a subsequent position, thereby also moving the gripped item 14 to the subsequent position. The subsequent position can be a second location, such as a second staging location (e.g., a packing location), which can be on a surface of an outbound conveyor 12 or can be at an intermediate location between the first location and the second location. It should be appreciated that the second position can be within a container or package at the packing location.

At step 112, the control unit reduces expansion of the first and second grippers 32 to disengage the grippers 32 from the item 14.

At step 114, the item 14 is conveyed away from the second location along the outbound conveyor 12. It should be appreciated that steps 104, 106, 108, 110, and 112 can be repeated as needed to plate a plurality of grouped items 14 onto the outbound conveyor 12 before performing step 114.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A gripping tool for attachment to an end of a robotic sortation arm, comprising:
 a base member;
 first and second fingers coupled to the base member, wherein at least one of the first and second fingers is movable relative to the other of the first and second fingers so as to adjust a distance between the first and second fingers;
 a first gripper attached to the first finger;
 a second gripper attached to the second finger,
  wherein the first and second grippers each have a compliant gripping surface, and are each selectively expandable so as to reduce the distance and grip select portions of an item with the respective gripping surface at a sufficient cumulative gripping force for lifting the item;

a first actuator that is operatively coupled to the first gripper and is configured to selectively expand the first gripper in a first direction; and a second actuator that is operatively coupled to the second gripper and is configured to selectively expand the second gripper in a second direction, wherein at least one of the first and second actuators is configured to vary an expansion force of the respective first gripper in the first direction or the second gripper in the second direction for accommodating various items.

2. The gripping tool of claim 1, wherein the first and second fingers have respective first and second plate bodies that each have a substantially rectangular geometry, such that each plate body defines a length along a longitudinal direction, a width along a lateral direction that is perpendicular to the longitudinal direction, and a thickness along a transverse direction that is perpendicular to the longitudinal and lateral directions, wherein the first and second directions are parallel with the transverse direction of the respective plate body.

3. The gripping tool of claim 2, wherein each of the first and second actuators includes a housing carried by the respective plate body, and the first and second grippers extend from the respective housing such that the housing and the respective first or second gripper collectively define an enclosed volume.

4. The gripping tool of claim 3, wherein the first and second actuators are each in communication with a control system for directing pressurized fluid into the respective enclosed volume to inflate the first and second grippers, respectively, from a neutral configuration to an inflated configuration, wherein the control system is configured to vary the expansion force of the first and second grippers.

5. A gripping tool, comprising:
first and second fingers coupled to a base member such that a distance between the first and second fingers is adjustable;
a first gripper attached to the first finger;
a second gripper attached to the second finger,
wherein the first and second grippers each have a compliant gripping surface and are each selectively expandable so as to reduce the distance and grip select portions of an item;
a first actuator that is operatively coupled to the first gripper and is configured to selectively expand the first gripper in a first direction; and
a second actuator that is operatively coupled to the second gripper and is configured to selectively expand the second gripper in a second direction,
wherein at least one of the first and second actuators is configured to vary an expansion force of the respective first gripper in the first direction or the second gripper in the second direction, and the at least one of the first and second actuators is also configured to vary a surface area of the respective compliant gripping surface in contact with the select portion of the item.

6. The gripping tool of claim 5, wherein the first and second actuators each include a housing carried by the respective plate body, and the first and second grippers extend from the respective housing.

7. The gripping tool of claim 6, wherein the first and second grippers are each selectively inflatable via the first and second actuators, respectively, to achieve the selective expansion in the respective first or second direction.

8. The gripping tool of claim 6, further comprising:
a first linkage that connects the first plate body to the base member; and
a second linkage that connects the second plate body to the base member,
wherein the first and second linkages are configured to selectively adjust the distance.

9. The gripping tool of claim 6, wherein the distance is adjustable between about 0 mm to about 400 mm.

10. The gripping tool of claim 5, wherein the at least one of the first and second actuators is further configured to vary a surface area of the respective compliant gripping surface in contact with the select portion of the item.

11. The gripping tool of claim 10, further comprising a control system for directing pressurized fluid into the first and second grippers to transition the first and second grippers between a neutral configuration and an inflated configuration.

12. The gripping tool of claim 11, wherein, in the inflated configuration, the first and second grippers each extend from the respective housing at an expansion distance in a range from about 5 mm to about 50 mm.

13. The gripping tool of claim 12, wherein the expansion distance is in a range of about 20 mm to about 40 mm.

14. The gripping tool of claim 5, wherein each of the first and second fingers includes one or more additional grippers that each have a compliant gripping surface and are each selectively expandable to grip additional select portions of the item.

15. The gripping tool of claim 5, further comprising at least one additional finger having an additional gripper, wherein the additional gripper has a compliant gripping surface and is selectively expandable so as grip an additional portion of the item.

16. The gripping tool of claim 5, wherein the gripping tool is configured such that adjusting the distance between the first and second fingers in combination with varying the expansion force of the respective first gripper or second gripper thereby varies a contact force per unit area of along the select portion of the item.

17. A robotic system for gripping items, comprising:
the gripping tool of claim 5; and
a processor in electronic communication with computer memory, wherein the processor is configured to execute computer readable instructions stored in the computer memory,
wherein the execution by the processor at least causes:
the gripping tool to be positioned adjacent an item;
the first and second fingers to move into proximity of respective first and second portions of a target item;
the first gripper to expand into engagement with the first portion of the item;
the second gripper to expand into engagement with the second portion of the item, wherein expanding the first and second grippers comprises controlling at least one of a gripping surface area and a gripping force of at least one of the first and second grippers at an interface with the respective portion of the item; and
the gripping tool to move to a subsequent position, thereby moving the gripped item to the subsequent position.

18. A method of lifting various items, comprising:
positioning an end-of-arm tool adjacent an item located at a first position;

moving first and second fingers of the tool into proximity of respective first and second portions of the item;

expanding a first gripper coupled the first finger into engagement with the first portion of the item;

expanding a second gripper coupled the second finger into engagement with the second portion of the item, wherein expanding the first and second grippers comprises controlling at least one of a gripping surface area and a gripping force of at least one of the first and second grippers at an interface with the respective portion of the item; and moving the tool to a subsequent position, thereby moving the gripped item to the subsequent position.

19. The method of claim 18, wherein expanding the first gripper comprises directing a pressurized fluid into a first volume at least partially defined by the first gripper, and expanding the second gripper comprises directing a pressurized fluid into a second volume at least partially defined by the second gripper.

20. The method of claim 19, wherein:

the steps of directing pressurized fluid into the first and second volumes comprises metering the pressurized fluid into the first and second volumes from a reservoir of the fluid; and the step of moving first and second fingers of the tool into proximity of respective first and second portions of the item comprises varying a distance between the first and second fingers.

\* \* \* \* \*